(12) United States Patent
Lyon et al.

(10) Patent No.: US 9,676,320 B2
(45) Date of Patent: Jun. 13, 2017

(54) VEHICLE LAMP

(71) Applicant: North American Lighting, Inc., Farmington Hills, MI (US)

(72) Inventors: Paul Andrew Lyon, Ann Arbor, MI (US); Karl Zeno Rauschendorfer, Rochester, MI (US); Chin-Jung Chen, Troy, MI (US)

(73) Assignee: NORTH AMERICA LIGHTING INC., Farmington Hills, MI (US)

( * ) Notice: Subject to any disclaimer, the term of this patent is extended or adjusted under 35 U.S.C. 154(b) by 0 days.

(21) Appl. No.: 13/946,234

(22) Filed: Jul. 19, 2013

(65) Prior Publication Data

US 2015/0023042 A1 Jan. 22, 2015

(51) Int. Cl.
*F21V 5/00* (2015.01)
*B60Q 1/00* (2006.01)
*F21S 8/10* (2006.01)

(52) U.S. Cl.
CPC ........ *B60Q 1/0035* (2013.01); *F21S 48/1233* (2013.01); *F21S 48/335* (2013.01)

(58) Field of Classification Search
CPC .... F21S 48/00; F21S 48/1258; F21S 48/1291; F21S 48/1283; F21W 2101/00; F21V 29/006
USPC ......................................... 362/520, 507, 290
See application file for complete search history.

(56) References Cited

U.S. PATENT DOCUMENTS

| | | | | |
|---|---|---|---|---|
| 3,851,947 A | * | 12/1974 | Montgomery | 359/533 |
| 4,845,600 A | * | 7/1989 | Matsumura et al. | 362/547 |
| 4,862,337 A | * | 8/1989 | Ohshio et al. | 362/547 |
| 4,972,303 A | * | 11/1990 | Machida | B60Q 1/302 340/479 |
| 5,702,173 A | * | 12/1997 | Kawamura | 362/505 |
| 5,975,723 A | * | 11/1999 | Daumueller et al. | 362/297 |
| 6,038,716 A | * | 3/2000 | Burnham | 4/614 |
| 6,045,248 A | * | 4/2000 | Ashizawa | 362/547 |
| 6,065,856 A | * | 5/2000 | Hiramatsu et al. | 362/547 |
| 6,161,951 A | * | 12/2000 | Yoneyama et al. | 362/516 |
| 6,168,303 B1 | | 1/2001 | Ashizawa et al. | |
| 6,220,739 B1 | * | 4/2001 | Harada et al. | 362/547 |
| 6,595,672 B2 | * | 7/2003 | Yamaguchi | 362/547 |
| 6,979,110 B2 | * | 12/2005 | Hasegawa | F21S 48/1233 362/455 |
| 8,408,767 B2 | * | 4/2013 | Hamid et al. | 362/507 |
| 2005/0128748 A1 | * | 6/2005 | Suwa | 362/253 |
| 2006/0250810 A1 | * | 11/2006 | Casenave et al. | 362/538 |
| 2006/0262667 A1 | * | 11/2006 | Lah et al. | 369/1 |
| 2011/0310630 A1 | * | 12/2011 | Nakata | F21S 48/2268 362/511 |
| 2012/0140500 A1 | | 6/2012 | Hamid et al. | |
| 2012/0307510 A1 | * | 12/2012 | Sugiyama | 362/516 |
| 2013/0070470 A1 | * | 3/2013 | Yang | 362/520 |
| 2014/0003075 A1 | * | 1/2014 | Yamada et al. | 362/511 |
| 2014/0192548 A1 | * | 7/2014 | Kracker et al. | 362/538 |

* cited by examiner

*Primary Examiner* — Anh Mai
*Assistant Examiner* — Matthew Peerce
(74) *Attorney, Agent, or Firm* — Brooks Kushman P.C.

(57) ABSTRACT

A vehicle lamp is provided with a housing for mounting to a vehicle and defining a outward opening. A lens is attached to the outward opening of the housing to define a lamp chamber therebetween. The lens has an appearance portion and a concealed portion. A condensation trap feature is formed along an inner surface of the concealed portion of the lens.

16 Claims, 3 Drawing Sheets

VEHICLE LAMP

TECHNICAL FIELD

The present disclosure relates to a vehicle lamp and, more particularly, to a vehicle lamp designed to prevent condensation from forming on the lens.

BACKGROUND

Conventional vehicle lamps have a sealed lamp chamber which includes a lens covering the outward opening of the chamber. When the temperature in the lamp chamber drops after the lamp has been turned off, condensation may form on the inner face of the lens. In addition to the aesthetic concerns from customers of condensation on the lens, condensation may cause light be refracted to create glare or other lighting performance disadvantages.

SUMMARY

According to one embodiment of the present disclosure, a vehicle is provided with an exterior lamp having a housing adapted to be mounted to a vehicle and defining an outward opening. A lens is attached to the outward opening of the housing to define a lamp chamber therebetween. The lens has an exposed portion and a concealed portion. A condensation trap feature is formed along an inner surface of the concealed portion of the lens. A vehicle panel is disposed adjacent the concealed portion thereby concealing the concealed portion and condensation trap feature In another embodiment, the exterior lamp is a head lamp comprises a head lamp and the vehicle panel comprises a bumper.

In yet another embodiment, the condensation trap feature includes a contoured inner surface having a first specific surface area. The specific surface area of the contoured inner surface is greater than a second specific surface area of the exposed portion.

In another embodiment, the contoured surface includes a prismatic contour pattern.

In still another embodiment, the first specific surface area of the contoured surface has a specific surface area being in a range of forty to eighty percent greater than the specific surface area of the exposed portion.

In another embodiment, the condensation trap region comprises a stair-step surface. The stair-step surface extends in the direction of airflow to increase airflow in the concealed portion.

In yet another embodiment, the exterior lamp includes a reflector which directs light from a light source through the appearance portion of the lens.

In another embodiment, the contoured inner surface is not parallel to an outer surface of the concealed portion of the lens.

According to one other embodiment of the present disclosure, a vehicle lamp is provided with a housing for mounting to a vehicle and defining an outward opening. A lens is attached to the outward opening portion of the housing to define a lamp chamber therebetween. The lens has an exposed portion and a concealed portion. A condensation trap area is formed along an inner surface of the concealed portion of the lens.

According to one other embodiment of the present disclosure, a vehicle lamp includes a housing for mounting to a vehicle and defining a outward opening. A lens is attached to the outward opening portion of the housing to define a lamp chamber therebetween. The lens has an inner surface with a first portion having a first specific surface area and a second portion having a second specific area being greater than the second specific area. The second portion forms a condensation trap area.

In another embodiment, light from a light source is projected through the first portion of the lens. Light is not projected through the second portion.

In yet another embodiment, the second portion comprises a concealed portion adapted to be concealed by a vehicle panel.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
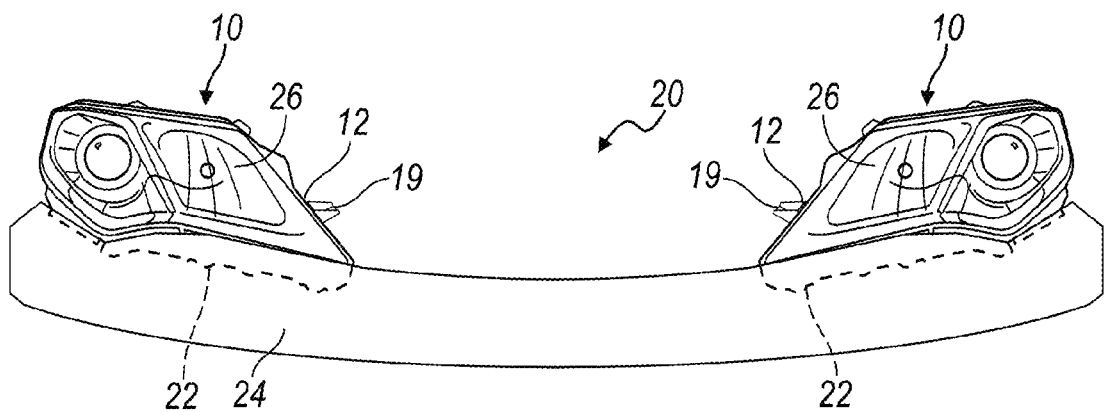
FIG. 1 illustrates a portion of a front of a vehicle including head lamps and a vehicle panel according to an embodiment of the present disclosure.

FIGS. 1-5 illustrates a vehicle head lamp 10. As shown in more detail in FIG. 3-4, the head lamp 10 includes a lamp housing 12 defining an outward opening. As shown for the head lamp 10, the outward opening is a forward-facing front opening. A lens 14 is mounted to the lamp housing 12 to cover the outward opening of the lamp housing 12. The lamp housing 12 and lens 14 define an enclosed light chamber 16. A light source 18 may be mounted in and supported by the lamp housing 12. The lamp housing 12 may also include mounting features 19, as shown in FIG. 1.

While the Figures illustrate a vehicle head lamp, the present disclosure may be widely applicable to other vehicle lights such as tail lamps, high mount stop lamps, fog lamps, or vehicle marker lamps, for example.

FIG. 1 illustrates a portion of the front of a vehicle 20 including a pair of head lamps 10. The head lamps 10 are positioned adjacent a vehicle body panel 24. A portion 22 of the head lamp 10 is concealed by the vehicle body panel. The vehicle body panel 24 may include vehicle structures such as a bumper, front fascia, grille, side panels, trunk, or any vehicle structure adapted to conceal a portion of a corresponding vehicle lamp.

The light chamber 16 may enclose humid air including water vapor. Water vapor, when cooled, may form undesirable condensation on the lens 14. There are several sources for water vapor in the light chamber 16. Humidity may be trapped in the light chamber 16 when the lamp 10 is manufactured. Alternatively, water vapor may be released from the materials used to manufacture the lamp 10, especially when the lamp is exposed to heat, either from the light source or from the environment. Holes (not shown) may be formed on the lamp housing 12 provided for communication inside and outside the light chamber 16 may also be a source of humidity air in the light chamber 16.

Condensation on the lens 14 may pose aesthetic and performance issues for a vehicle lamp 10. Condensation may cause light to be refracted to create glare or other lighting performance disadvantages. Customers may also be concerned about the appearance of the condensation, creating the perception of poor quality and warranty issues.

In order to minimize the aesthetic and performance issues with condensation on the lens 14, it would be advantageous for condensation to instead form on the concealed portion 22 of the lens. The concealed portion 22 is not visible by consumers and light from the light source 18 does not extend through the concealed portion 22 of the lens.

A condensation trap feature 30 may be formed along an inner surface 32 of the concealed portion 22 of the lens 14. The condensation trap feature 30 provides increased surface area or increased airflow. Condensation rate is directly proportional to surface area, and increases linearly with the velocity of the airflow. Therefore, condensation would form on the concealed portion 22 instead of the appearance or exposed portion 26 of the lens.

Figure 2:
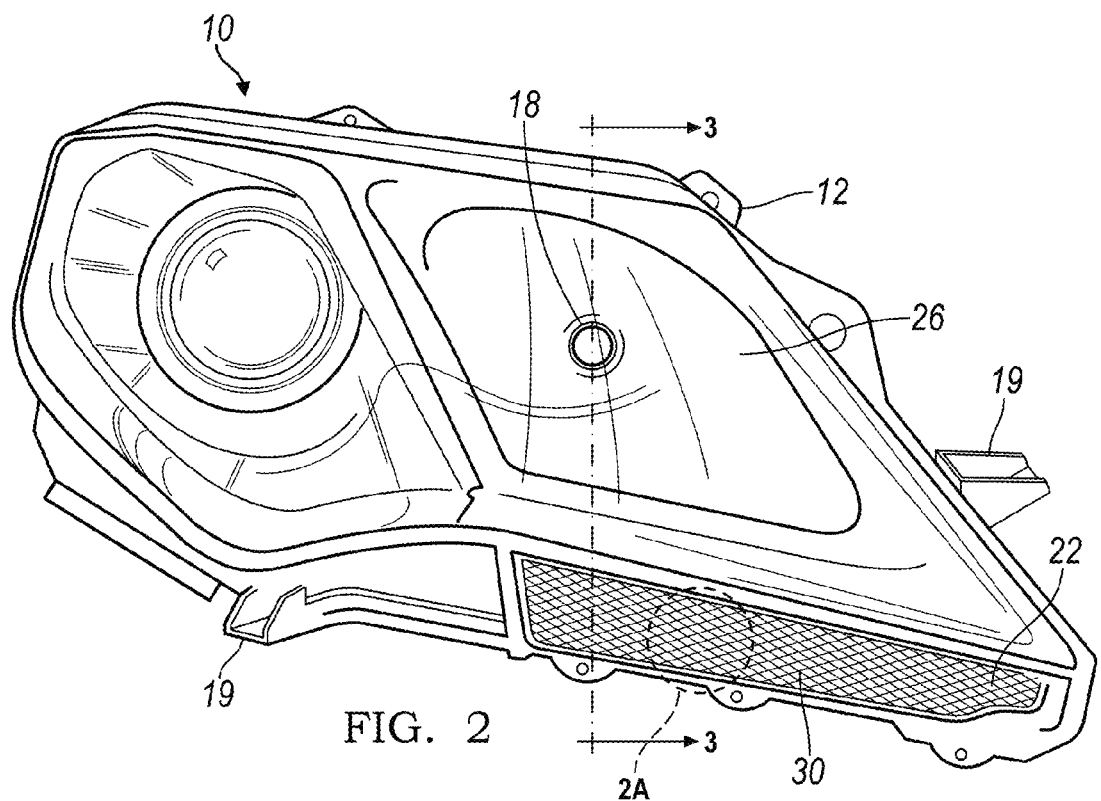
FIG. 2 illustrates the head lamp of FIG. 1 according to an embodiment of the present disclosure.
Figure 2A:
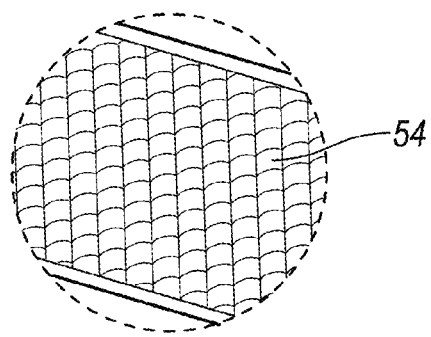
Figure 3:
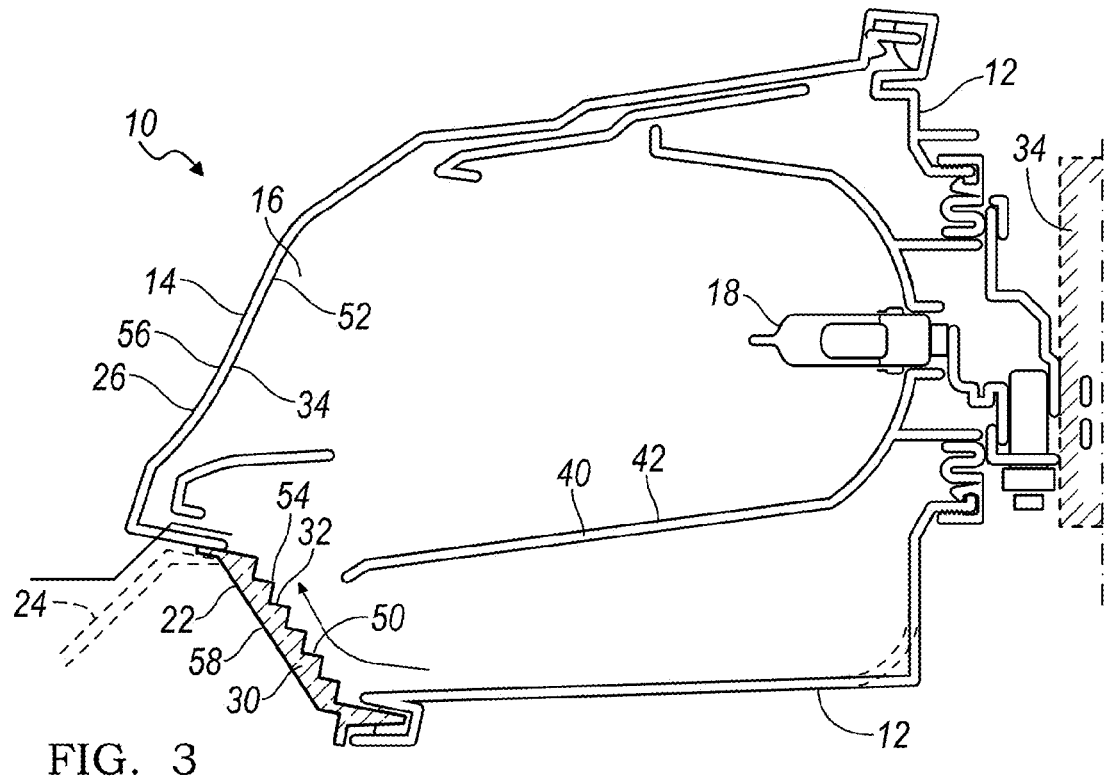
FIG. 3 illustrates a section view of the portion of the front of the vehicle along section A-A of FIG. 2 according to an embodiment of the disclosure.
Figure 4:
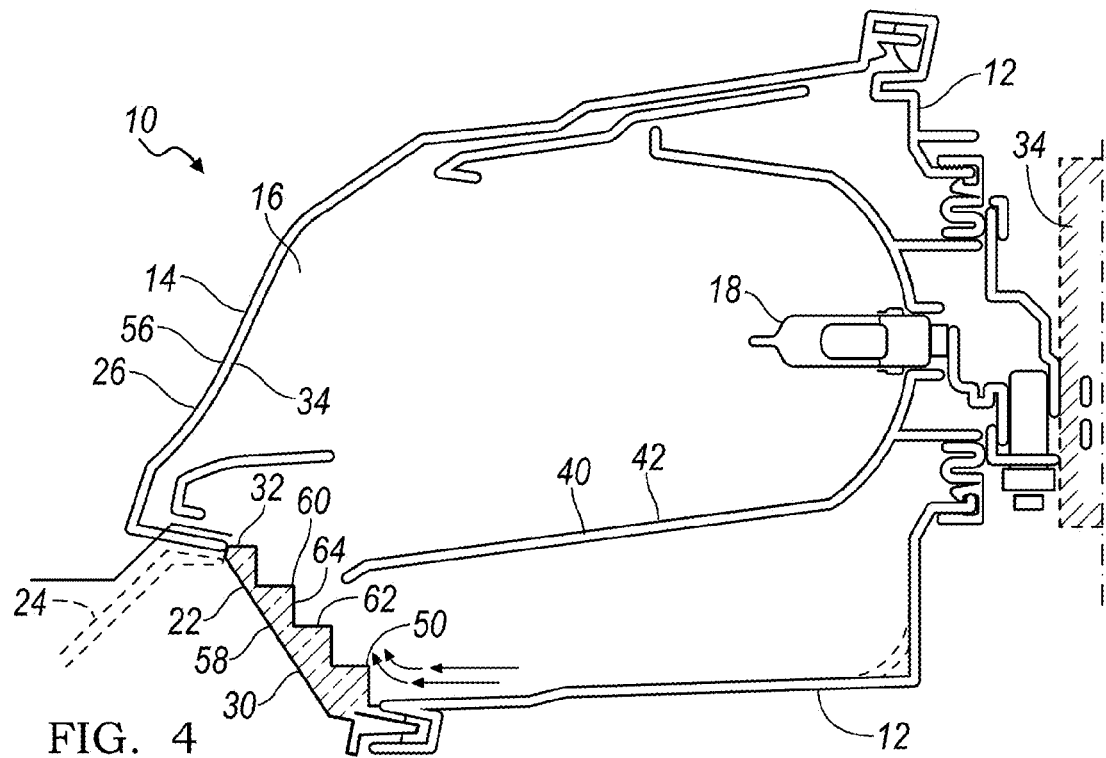
FIG. 4 illustrates an example section view of the portion of the front of the vehicle along section A-A of FIG. 2 according to another embodiment of the present disclosure.

FIGS. 3-4 illustrate a cross section view of the head lamp 10 in along section A-A of FIG. 2. In particular, FIGS. 3-4 illustrate the condensation trap feature 30 in more detail. In the embodiments illustrated in FIGS. 3-4, the head lamp 10 includes the lamp housing 12 defining an outward opening in the fore-aft direction of the vehicle 20. The lens 14 is mounted to the lamp housing 12 to cover the outward opening of the lamp housing 12. The lamp housing 12 is adapted to mount to a vehicle 34 of vehicle mounting structure.

The lens 14 includes the concealed portion 22 and the exposed portion 26. The concealed portion 22 and appearance portion 26 may be formed as one-piece through a single process such as injection molding. The concealed portion 22 and appearance portion 26 may also be formed separately and joined together. The concealed portion 22 and appearance portion 26 may be joined by a heat stake, welding, intermediate component, for example, or any suitable process to cover the outward opening defined by the housing 12.

The head lamp 10 also includes a reflector 40 mounted in the housing 12. The reflector 40 defines a reflective surface 42 to project light from the light source 18 through the appearance portion 26 of the lens 14. The light source 18 may be mounted to and supported by the reflector 40.

The concealed portion 22 of the lens 14 is located adjacent the reflector 40. In the embodiments shown in FIGS. 3-4, the concealed portion 22 is disposed below the reflector 40 in a generally vertical direction.

In FIG. 3, the inner surface 32 of the concealed portion 22 has a surface with contoured surface area 50 which increases the surface area. The exposed portion 26 of the lens 14 has an inner surface 34 that is generally smooth. The smooth inner surface 34 of the exposed portion 26 allows light from the light source 18 to pass through the smooth inner surface 34 without being diffracted or diffused and is generally parallel to an outer surface 56 of the exposed portion 26. In contrast, the inner surface 32 along the concealed portion 22 is contoured. As shown in FIGS. 3-4, the contoured inner surface 32 is not parallel to the outer surface 58 along the concealed portion 22.

In addition, the specific surface area of the contoured inner surface 32 of the concealed portion 22 is greater than the specific surface area of the inner surface 34 along the exposed portion 26 of the lens 14. The specific surface area is known and defined as the surface area per cross-sectional area.

For example, as illustrated in FIGS. 1-3, the contoured inner surface 34 is defined by a pattern of prisms or cubes 54. The prismatic surface contour 54 will increase the specific surface area by at least sixty percent compared with the specific surface area of the generally smooth surface 34 along the appearance portion 26. In another embodiment, the specific surface area of the prismatic surface contour 54 may be increased from forty to eighty percent, or any suitable increase in specific surface area depending on the prism shape, the lamp size, the total area of the concealed portion 22 and other system features that effect condensation formation in the lamp.

Since the condensation rate, or conversely, the evaporation rate, is directly proportional to the surface area, the contoured surface area 50 with an increased surface area will promote condensation. By promoting condensation on the contoured surface area 50 of the concealed portion 22, condensation is minimized or even prevented along the appearance portion 26 of the lens 14.

FIG. 2 illustrates a close up view of the prismatic surface contour 54 as viewed from the outer surface 58. The reflective outer surface 58 or simulates a reflective surface defined by reflex cubes. The prismatic surface contour 54 may define a plurality of reflex cubes which reflect light. The reflex cube contour is defined by a plurality of prisms formed by three isosceles right triangles which share an apex point where all the common length sides converge, and an equilateral triangle at the base that is formed by the unequal sides.

Since the concealed portion 22 is hidden from view by the vehicle panel 24, the inner surface 32 could also be a prismatic surface contour 54 which may be less reflective or not reflective. The prismatic surface contour 54, or even simulated reflex cube contour may be easily used in the vehicle lamp 10 since this contour is commonly employed in the design and manufacture of vehicle lamps.

Other surface contours are also possible for providing an increased surface area along the concealed portion 22. For example, the inner surface 32 may have an undulating or wavy shape, raised ridges, dimples, step-profile, or any suitable surface contour with increased surface area. The inner surface 32 may also have flutes or pillows, or other suitable surface contours those of ordinary skill in the art would know. The inner surface contour 32 will increase the surface area by at least thirty percent compared with the generally smooth surface 52 along the appearance portion 26. In another embodiment, the surface area from the inner surface contour 32 is increased from twenty to eighty percent, or any suitable increase in surface area depending on the contour, the lamp size and other system features that effect condensation formation in the lamp.

Some surface contours on the inner surface 32 of the concealed portion 22 when positioned along the natural convection of air, will increase the air velocity. For example, a stair-step contour 60 may extend from the inner surface 32, as shown in greater detail in FIG. 4. The stair-step surface 60 is formed by a plurality of steps 62 connected by landing 64.

The stair-step surface 60 may extend generally linearly along the concealed portion 22 or may form a circular stair-step.

The stair-step contour 60, as illustrated in FIG. 4, changes the airflow and creates turbulence along the stair-step contour 60. The airflow must pass over the steps 62 and landings 64 as a result of natural convection. While flowing over step surface 62, the turbulent airflow generated mixes the air and increases contact of moist air with the lens surface. By appropriate placement of the stair-step contour 60, the moisture content of the airflow is manipulated to increase condensation on the lens in a desired direction or at a desired location.

Figure 5:
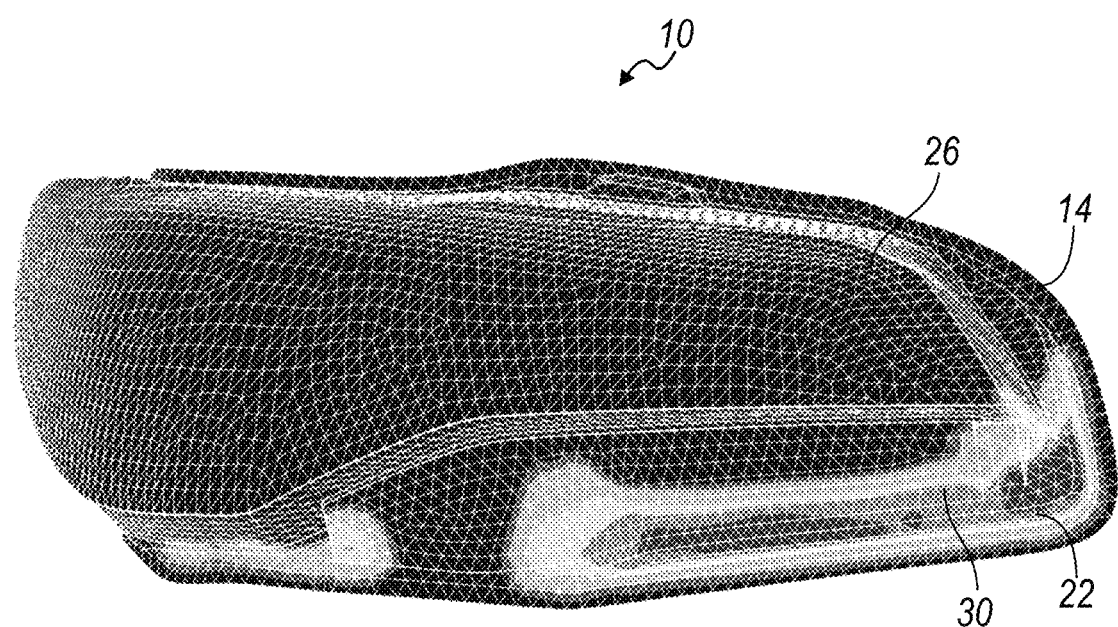
FIG. 5 illustrates a condensation image of the head lamp of FIG. 1 according to an embodiment of the present disclosure.

FIG. 5 illustrates an example of a condensation simulation of the head lamp 10 having a condensation trap 30 formed on the lens 14. The light colored areas represent cooler regions where condensation forms. In contrast, the dark areas are warmer regions where there is no condensation on the lens. By providing a condensation trap feature 30 along the cooler, concealed portion 22 of the lens 14, condensation is promoted along the condensation trap feature 30 having increased surface area on a part of the lens that is hidden from view.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle lamp comprising:
   a housing for mounting to a vehicle and defining an outward opening; and
   a transparent lens attached to the outward opening of the housing to define a lamp chamber therebetween, the lens having the lens having an exposed portion and a condensation-trap area, wherein the condensation-trap area is formed below the exposed portion on an inner surface of the lens and located in a portion of the lamp chamber that is concealed, the condensation-trap area having a specific-surface-area-per-cross-sectional area of the inner surface that is larger than the specific-surface-area-per-cross-sectional area of the exposed portion,
   wherein the inner surface comprises at least one of a prismatic contour pattern and a triangle pattern forming a plurality of cube portions,
   wherein light from a light source propagates outward through the exposed portion of the lens, but visible light is blocked from propagating into the condensation-trap area.

2. The vehicle lamp according to claim 1 further comprising a reflector disposed in the lamp chamber, wherein the condensation-trap area is formed below the reflector.

3. The vehicle lamp according to claim 1 wherein the specific-surface-area-per cross-sectional area of the inner surface of the condensation-trap area is at least forty-percent greater than the specific-surface-area-per-cross-sectional area of the exposed portion of the lens.

4. The vehicle lamp according to claim 1 wherein the inner surface of the condensation-trap area comprises a stair-step surface.

5. The vehicle lamp according to claim 1 wherein the condensation-trap area is adapted to be concealed by a vehicle panel.

6. A vehicle lamp comprising:
   a housing for mounting to a vehicle and defining an outward opening; and
   a transparent lens attached to the outward opening of the housing to define a lamp chamber therebetween, the lens having an exposed portion and a concealed portion, wherein a condensation-trap feature is formed on an inner surface of the concealed portion of the lens,
   wherein the specific-surface-area-per-cross-sectional area of the concealed portion is contoured being at least forty-percent larger than the specific-surface-area-per-cross-sectional area of the exposed portion, and
   wherein the inner surface and outer surface of the condensation-trap feature are not substantially parallel,
   wherein light from a light source propagates outward through the exposed portion of the lens, but visible light is blocked from propagating into the condensation-trap area.

7. The vehicle lamp according to claim 6 wherein the condensation-trap feature is formed below the exposed portion in the generally vertical direction.

8. The vehicle lamp according to claim 6 wherein the inner surface comprises a prismatic contour pattern.

9. The vehicle lamp according to claim 6 further comprising a reflector disposed in the lamp chamber, wherein light from a light source propagates outward through the lens and is visible to an observer outside the vehicle, but light from the light source is blocked from propagating into the condensation-trap feature by at least one reflective surface on the reflector.

10. The vehicle lamp according to claim 6 wherein the condensation trap feature comprises a stair-step surface.

11. A vehicle comprising:
    an exterior lamp housing adapted to be mounted to a vehicle, the lamp housing defining an outward opening;
    a transparent lens attached to the outward opening of the housing to define a lamp chamber therebetween, the lens having an exposed portion and a concealed portion, wherein a condensation-trap feature is formed on an inner surface of the concealed portion of the lens below the exposed portion in the generally vertical direction, the condensation-trap feature having contoured pattern such that the specific-surface-area-per-cross-sectional area that is larger than the specific-surface-area-per-cross-sectional area of an inside surface of the exposed portion;
    a reflector disposed in the lamp chamber, wherein the condensation-trap feature is located below the reflector; and
    a vehicle panel disposed adjacent the concealed portion that covers the concealed portion and condensation-trap feature, wherein light from a light source propagates outward through the exposed portion of the lens, but visible light is blocked from propagating into the condensation-trap area.

12. The vehicle according to claim 11 wherein the exterior lamp housing comprises a head lamp housing and the vehicle panel comprises a bumper.

13. The vehicle according to claim 11 wherein the inner surface of the condensation-trap feature comprises a prismatic contour pattern.

14. The vehicle according to claim 11 wherein the inner surface of the condensation-trap feature has a specific-surface-area-per-cross-sectional area being at least forty percent greater than the specific-surface-area-per-cross-sectional area of the inside surface of the exposed portion.

15. The vehicle according to claim 11 wherein the inner surface comprises a stair-step contoured pattern.

16. The vehicle according to claim 11 wherein the inner surface is not parallel to an outer surface of the concealed portion.

* * * * *